United States Patent
Branchereau

(10) Patent No.: US 7,201,380 B2
(45) Date of Patent: Apr. 10, 2007

(54) ROTARY SHAFT DYNAMIC SEAL PROVIDED WITH AN ANGULAR ENCODER DEVICE, A DEVICE INCLUDING SUCH A SEAL, AND A METHOD OF FABRICATING SUCH A SEAL

(75) Inventor: Bernard Branchereau, Segre (FR)

(73) Assignee: Hutshinson, Paris (FR)

( * ) Notice: Subject to any disclaimer, the term of this patent is extended or adjusted under 35 U.S.C. 154(b) by 0 days.

(21) Appl. No.: 10/687,205

(22) Filed: Oct. 16, 2003

(65) Prior Publication Data

US 2004/0124586 A1 Jul. 1, 2004

(30) Foreign Application Priority Data

Nov. 7, 2002 (FR) .................................. 02 13940

(51) Int. Cl.
*F16J 15/28* (2006.01)
(52) U.S. Cl. ........................ 277/549; 277/571; 277/572
(58) Field of Classification Search ................ 277/549, 277/571, 572, 561
See application file for complete search history.

(56) References Cited

U.S. PATENT DOCUMENTS

| | | | | |
|---|---|---|---|---|
| 5,309,094 A | * | 5/1994 | Rigaux et al. .............. | 324/174 |
| 5,407,213 A | * | 4/1995 | Ouchi et al. ................ | 277/317 |
| 5,492,339 A | * | 2/1996 | Lederman ................... | 277/362 |
| 5,575,568 A | * | 11/1996 | Rigaux et al. .............. | 384/448 |
| 6,499,885 B2 | * | 12/2002 | Toda et al. ................. | 384/448 |
| 6,605,938 B1 | * | 8/2003 | Sentoku et al. ............. | 324/174 |
| 6,682,221 B2 | * | 1/2004 | Rutter et al. ................ | 384/448 |
| 6,913,264 B2 | * | 7/2005 | Kurth .......................... | 277/353 |
| 2002/0131659 A1 | * | 9/2002 | Rutter et al. ................ | 384/486 |

FOREIGN PATENT DOCUMENTS

| DE | 100 50 983 A1 | 5/2002 |
|---|---|---|
| EP | 0 949 510 A1 | 10/1999 |
| EP | 1 164 318 A2 | 12/2001 |

OTHER PUBLICATIONS

French Preliminary Search Report for FR 02 13940 dated Apr. 10, 2003.

* cited by examiner

*Primary Examiner*—Vishal Patel
(74) *Attorney, Agent, or Firm*—Marshall, Gerstein & Borun LLP

(57) ABSTRACT

A dynamic seal for a rotary shaft, the seal comprising a sleeve for being constrained in rotation on the shaft and an annular lip of polymer having a low coefficient of friction to come into sliding rotary contact with a stationary casing surrounding said shaft so that the dynamic seal provides sealing between said shaft and said casing. An annular encoder element of magnetizable polymer and presenting at least one polarized mark is secured to said sleeve and forms a support for said lip. The invention also provides a device including such a seal, and a method of fabricating the seal.

7 Claims, 4 Drawing Sheets

ROTARY SHAFT DYNAMIC SEAL PROVIDED WITH AN ANGULAR ENCODER DEVICE, A DEVICE INCLUDING SUCH A SEAL, AND A METHOD OF FABRICATING SUCH A SEAL

The present invention relates to a dynamic seal for a rotary shaft, the seal comprising a sleeve for being constrained in rotation on the shaft and an annular lip of polymer having a low coefficient of friction to come into sliding rotary contact with a stationary casing surrounding said shaft so that the dynamic seal provides sealing between said shaft and said casing.

More particularly, the present invention relates to such a seal fitted with an angular encoding device.

BACKGROUND OF THE INVENTION

In numerous applications, and in particular for internal combustion engine crankshafts and for outlet shafts from gearboxes, the rotary shafts are fitted with angular encoder devices to sense their instantaneous speed of rotation and/or angular position and/or direction of rotation. Such rotary shafts are generally fitted with dynamic seals in order to prevent any leakage of oil between the shaft and the opening in the casing through which the shaft passes. It is desired to group together the angular sensing device and the dynamic seal in order to limit the total amount of space occupied by these two elements. For example, patent EP-A-0 949 510 describes a dynamic seal fitted with an angular sensing device which comprises a sleeve secured to the rotary shaft and provided with a collar covered in a magnetizable coating. The dynamic seal proper is secured to the stationary portion and presents a lip which bears against the outside surface of the sleeve. That assembly made up of two elements requires:

either two mounting operations, thus requiring the operator to verify that the elements have been properly positioned relative to each other;

or else the use of complex tooling enabling both elements to be mounted simultaneously.

OBJECTS AND SUMMARY OF THE INVENTION

An object of the present invention is to mitigate those drawbacks by proposing a dynamic seal that provides angular encoding for the shaft and that is capable of being mounted easily in a single operation. Nevertheless, the overall size and manufacturing cost of the device should remain as small as possible.

To this end, the present invention provides a dynamic seal as defined above, wherein an annular encoder element of magnetizable polymer presenting at least one polarized mark is secured to said sleeve and presents at least one annular surface to which said lip is bonded.

This provides a unitary assembly serving both to sense the angle of the shaft and to provide sealing between the shaft and the stationary casing.

The unitary assembly can easily be assembled in a single operation, for example by engaging the sleeve on the rotary shaft.

In addition, the cost of producing the single part is lower than the cost of producing the dynamic seal and the angular sensing device described in above-mentioned patent EP-A-0 949 510.

In preferred embodiments of the invention, recourse is also made to one or more of the following dispositions:

the encoder element is made of elastoferrite;

the lip is made of PTFE;

the lip is bonded directly to the encoder element;

the annular surface of the encoder element extends radially;

the encoder element is bonded directly to the sleeve, said sleeve being made of metal;

the encoder element presents a circular track provided with polarized marks formed by sectors with alternating north and south polarization;

the encoder element presents a first annular face facing radially inwards which is bonded directly to an outside wall of the longitudinally-extending sleeve, and a second annular face facing radially outwards on which the track provided with polarized marks is formed;

the second annular face presents a portion extending along a fraction of the shaft which is not surrounded by the stationary casing, the track provided with polarized marks being formed on said portion; and the sleeve presents an annular collar extending radially and in which the encoder element presents a first annular face extending radially, which face is bonded directly to said collar, and a second annular face parallel to the first face, on which the track provided with polarized marks is formed.

The invention also provides a device comprising a rotary shaft, a casing filled with liquid in which the rotary shaft penetrates, and a dynamic seal as defined above having its sleeve constrained to rotate with the rotary shaft and having its sealing lip in sliding contact with the casing, thereby providing sealing between said shaft and said casing.

Finally, the invention also provides a method of fabricating a dynamic seal for a rotary shaft as defined above, the seal comprising a sleeve, an annular encoder element made of elastoferrite, and a sealing lip made of a polymer having a low coefficient of friction, the method comprising the following steps:

placing said sleeve, a blank for said encoder element, and a preform for said lip concentrically in a first half-mold, said blank being at least partially in contact with said sleeve, and said preform being at least partially in contact with said blank; and hot-pressing by means of a second half-mold to vulcanize said blank and also to shape said blank for the encoder element and said preform for the lip to take up a determined profile.

BRIEF DESCRIPTION OF THE DRAWINGS

Other characteristics and advantages of the invention appear from the following description given by way of non-limiting example and with reference to the accompanying drawings, in which.

MORE DETAILED DESCRIPTION

In the various figures, the same references numerals are retained to designate elements that are identical or similar.

Figure 1:
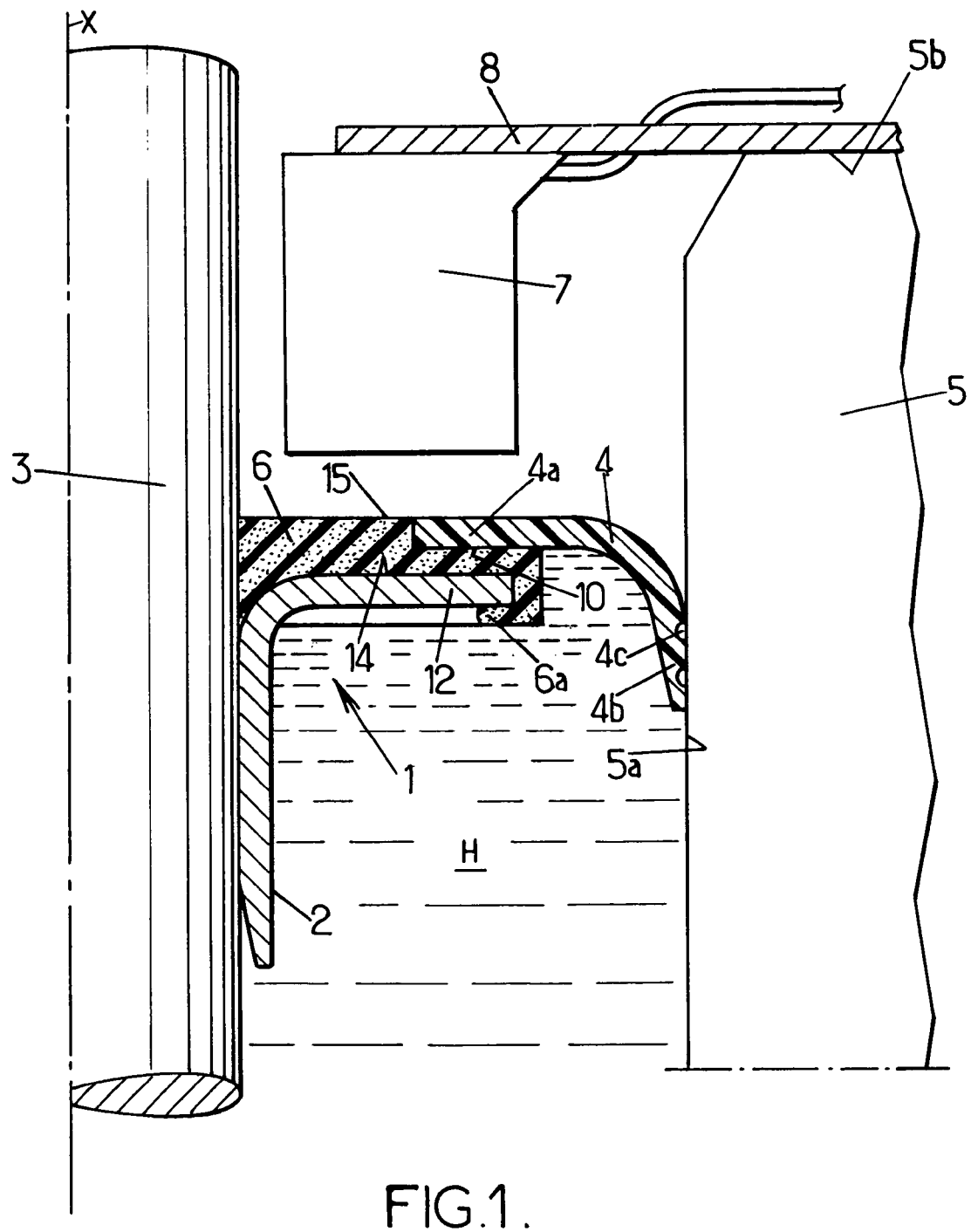
FIG. 1 is a simplified longitudinal section view of a shaft provided with a dynamic seal constituting a first embodiment of the invention.

As can be seen in FIG. 1, the dynamic seal 1 comprises a sleeve 2 constrained to rotate on a rotary shaft 3, and an annular sealing lip 4 coming into sliding rotary contact with a stationary casing 5 surrounding the shaft 3 so as to provide sealing between said shaft and said casing.

The shaft 3 may be constituted by the crankshaft of an internal combustion engine which contains hot oil under pressure in an inside space H defined by the stationary casing 5. However it will naturally be understood that the dynamic seal shown can be mounted on any type of rotary shaft, for example an outlet shaft from a gearbox.

The sleeve 2 is made of metal and is mounted on the rotary shaft 3 as a force-fit. This particularly simple type of mounting enables the sleeve 2 to be constrained to move with the shaft both in rotation and in translation. However any other form of mounting could be used providing it ensures that the sleeve is constrained to rotate with the shaft. It is also possible to envisage using a sleeve made of plastics material.

The annular lip 4 is made of a polymer having a low coefficient of friction, preferably poly-tetra-fluoroethylene (PTFE), so as to limit the heating due to the lip sliding against the wall 5a of the stationary casing 5 when the seal is rotating at high speed. The lip 4 comprises a base 4a extending radially relative to the axis of rotation X of the shaft, and an end 4b which presents a degree of flexibility and which is curved towards the inside of the casing 5 under the effect of contact with the stationary portion of the casing so as to fit closely to the wall 5a of the casing. The end may also be curved towards the outside of the casing, as is shown by way of example in FIG. 2, and it may have grooves 4c for improving sealing.

An annular encoding element 6 of magnetizable polymer is secured to the sleeve 2 and forms a support surface on which the lip 4 is bonded.

The annular encoder element 6 presents at least one mark that is polarized in such a manner that the rotation of the shaft 3 can be detected as the polarized mark goes past a sensor 7 placed close to the encoder element 6. It is possible to use a Hall effect sensor for this purpose or any other type of sensor capable of detecting variation in magnetic field and capable of sending an electric signal to a data processor unit, such as an electronic control unit for the internal combustion engine, for example.

This provides a single part for sensing the angle of the shaft and for providing sealing between the shaft and the stationary casing.

The encoder element 6 is made of elastoferrite, i.e. an elastomer containing particles of ferrite and capable of generating a magnetic field. By means of this material, it is possible to assemble together the various elements of the dynamic seal in a manner that is particularly simple, for example using the method described below. Elastoferrite, which is different in kind to PTFE can be bonded directly to the metal sleeve. In addition, elastoferrite can also be bonded directly to PTFE. Thus, the encoder element constitutes means for fixing the PTFE lip 4 to the metal sleeve 2, whereas it is otherwise particularly difficult to bond or stick PTFE onto a metal element or any element presenting a surface that is smooth and hard.

In the various embodiments shown, the encoder element 6 presents an annular surface 10 extending radially relative to the axis X of the shaft 3 in order to form the support surface to which the base 4a of the lip is bonded. This annular surface 10 is obtained by injecting molten elastoferrite into a mold in which the lip 4 has already been placed. It should be observed that the lip 4 may merely be placed flat in the mold since the lip 4 can be bonded to the encoding element 10 merely by surface contact with the molten elastoferrite.

In the embodiment shown in FIG. 1, the sleeve 2 presents an annular collar 12 extending radially. The encoder element presents a first annular face 14 extending radially relative to the axis of rotation X of the shaft 3, and a second annular face 15 parallel to the first face 14. The first face 14 is bonded directly to the collar 12 of the sleeve and the track provided with polarized marks is formed on the second face 15. The sensor 7 is disposed longitudinally facing said second face 15 by means of a plate 8 fixed to the outside face 5b of the casing.

The track may comprise a set of sectors that are uniformly annularly distributed and that are polarized alternately north and south, possibly together with a zone forming a magnetic singularity in order to be able to determine an absolute angular position for the shaft.

Figure 2:
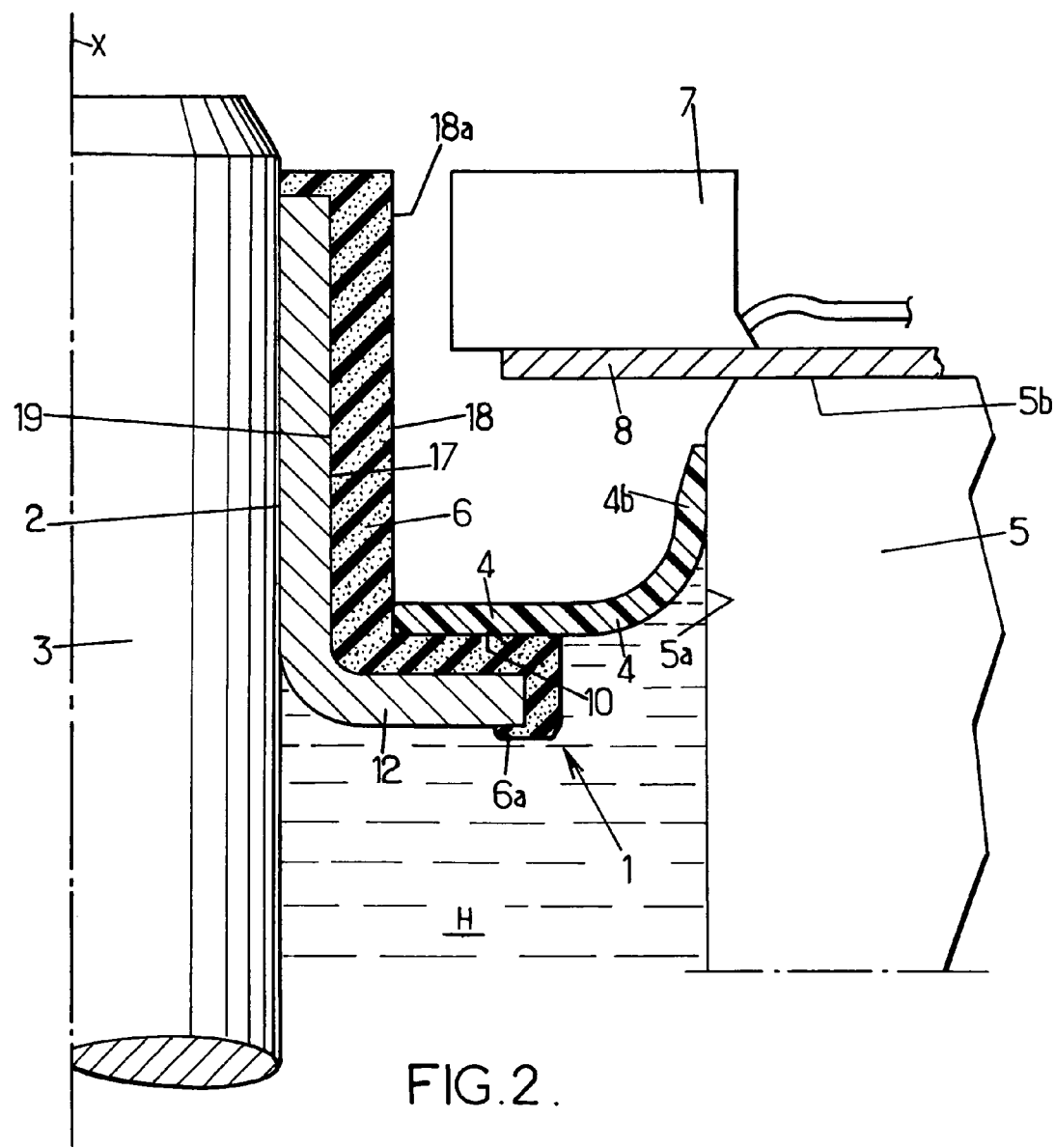
FIG. 2 is a view analogous to FIG. 1 showing a second embodiment.
Figure 3:
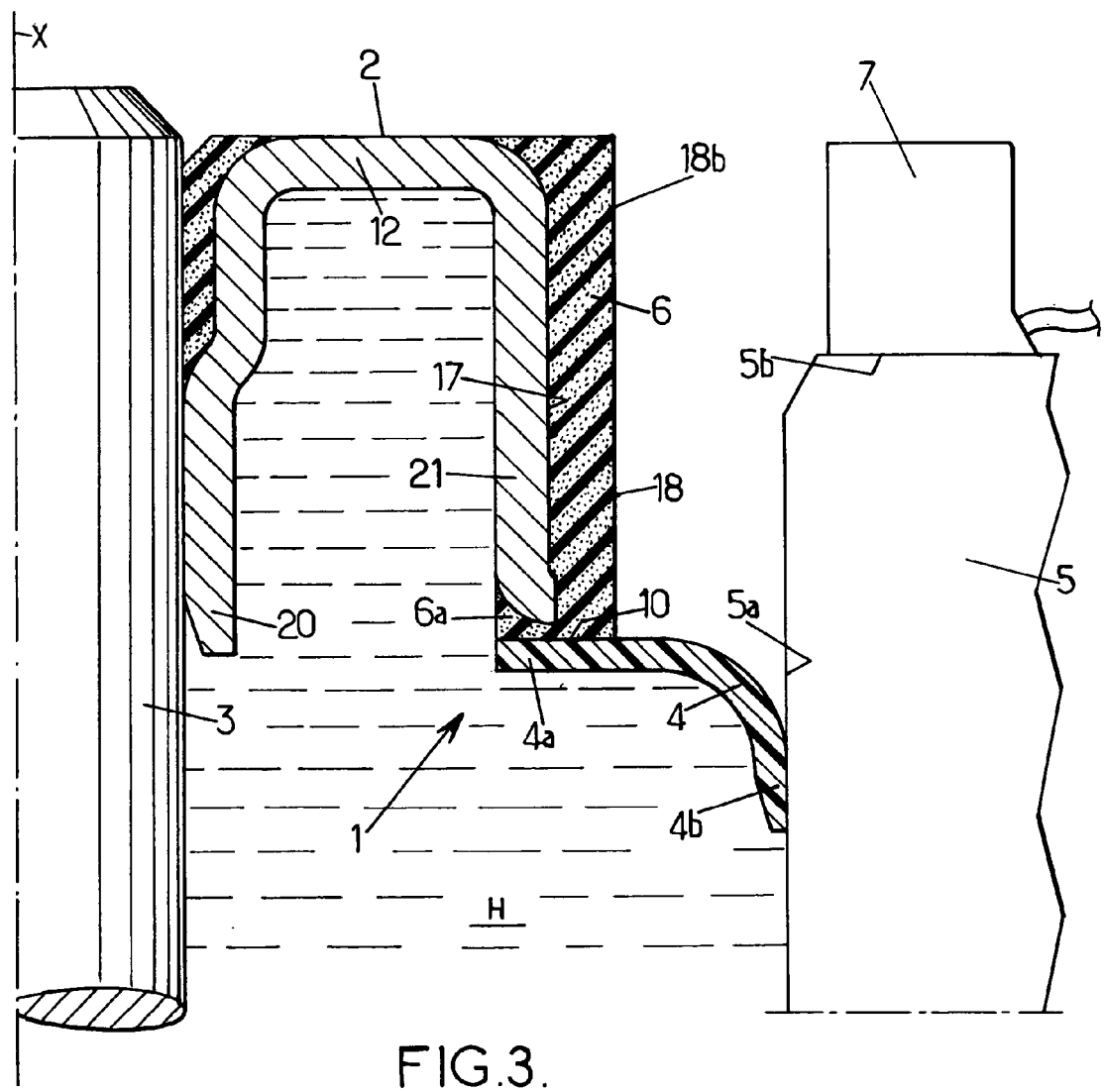
FIG. 3 is a view analogous to FIG. 1 showing a third embodiment.

In the embodiments shown in FIGS. 2 and 3, the encoder element 6 has a first annular face 17 facing radially inwards and a second annular face 18 facing radially outwards and having the track with polarized marks formed thereon. The first face 17 is bonded directly on an outside wall 19 of the sleeve 2 which extends longitudinally along the shaft 3. The track having polarized marks is formed on the second face 18 of the encoder element 6. Under such circumstances, the sensor 7 is placed radially facing said track.

The second face 18 of the encoder element 6 presents a portion 18a extending along a fraction of the shaft 3 which is not surrounded by the stationary casing 5 and on which the track having the polarized marks is formed. This enables the sensor 7 to be mounted on the outside face 5b of the stationary casing, possibly by means of an intermediate plate 8.

In the embodiment shown in FIG. 3, the metal sleeve 2 has a U-shaped cross-section; a first branch 20 of the U-shape is engaged as a force-fit on the rotary shaft 3, while the second branch 21 of the U-shape forms the outside wall of the sleeve. The first annular face 17 of the encoder element 6 adheres directly to said wall 21.

Figure 4:
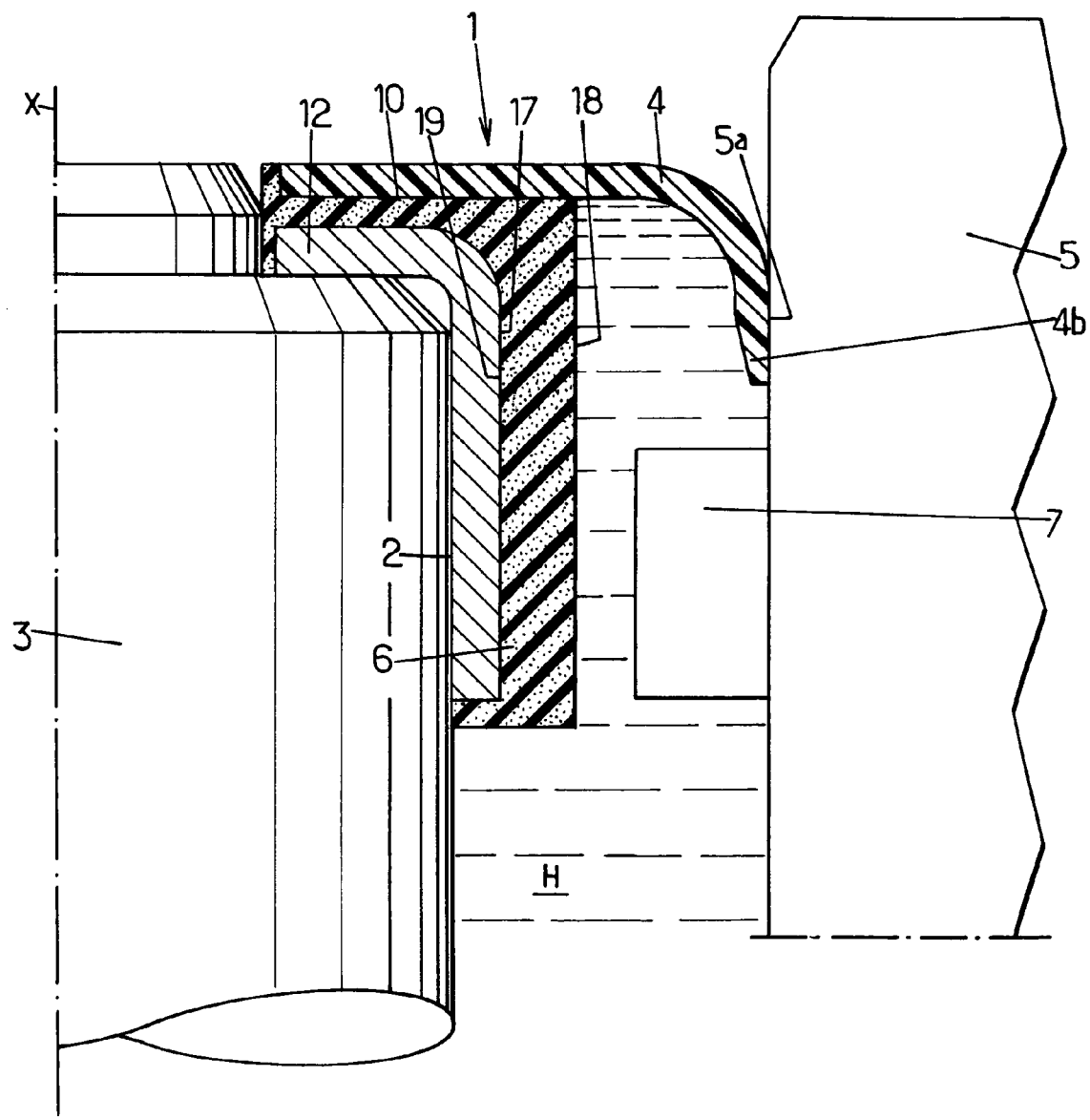
FIG. 4 is a view analogous to FIG. 1 showing a fourth embodiment.

In a fourth embodiment as shown in FIG. 4, the sensor 7 is disposed in the inside space H of the oil-containing casing 5, against the wall Sa of the casing that faces radially towards the shaft 3.

A second annular face 18 of the encoder element 6 then extends longitudinally along the shaft 3 from the inside of the lip 4 and carries a track provided with polarized marks that is arranged to face the sensor 7.

The present invention also provides a method of fabricating the above-described dynamic seal. In this fabrication method, the sleeve 2, a blank for said encoder element 6, and a preform for the PTFE lip 4 are placed in a first half-mold in such a manner that the blank for the encoder element 6 comes at least partially into contact with the sleeve 2, and the lip 4 is at least partially in contact with the blank. Hot-pressing is then performed using a second half-mold so as to vulcanize the elastoferrite blank.

Vulcanizing the blank for the encoder element 6 enables it to be bonded to the metal sleeve 2 and also enables it to be bonded to the base 4a of the PTFE lip.

Hot-pressing thus enables the blank for the encoder element 6 and the preform for the lip 4 to be shaped into their final shapes, so initially they can be shaped merely as washers. Creep of the elastoferrite under the action of the pressure and the heat serves in particular to obtain the rim 6a which becomes overmolded on the sleeve 2.

The final profile for the end 4b of the lip, and in particular its groove 4c, can be obtained during the above-described fabrication method, and their function is to improve the sealing at the contact between the lip 4 and the casing 5.

The method also makes it possible to assemble together the various elements constituting the seal 1 and to obtain the final shape for the encoder element 6 and for the lip 4 in a single operation.

However, the dynamic seal of the present invention could naturally be fabricated using other methods. In particular, the encoder element could be secured to the sleeve using mechanical fastener means and the polymer lip could be stuck to the encoder element, which is itself made of polymer.

What is claimed is:

1. A dynamic seal for a rotary shaft comprising a one-piece sleeve for being constrained in rotation directly on the shaft, the sleeve having a first portion disposed parallel to the shaft and a second portion forming an annular collar extending either radially from or parallel to the first portion, and an annular lip of PTFE polymer having a low coefficient of friction to come into sliding rotary contact with a stationary casing surrounding said shaft so that said dynamic seal provides sealing between said shaft and said casing, wherein said dynamic seal further comprises an annular encoder element of magnetizable polymer, wherein the encoder element includes a first annular face and a second annular face, the first annular face bonded directly to the annular collar or to the annular collar and the first portion, the second annular face having an first surface and a second surface, wherein the first surface presents a circular track provided with polarized marks formed by sectors with alternating north and south polarization, and wherein the annular lip is bonded directly to the second surface, the first surface and the second surface being either parallel or perpendicular to one another.

2. A seal according to claim 1, wherein the encoder element is made of elastoferrite.

3. A seal according to claim 1, wherein the second surface of the encoder element extends radially.

4. A seal according to claim 1, said sleeve being made of metal.

5. A seal according to claim 1 wherein the first annular face of the encoder element faces radially inwards and is bonded directly to an outside wall of the first portion of the sleeve, and wherein the second annular face of the encoder element faces radially outwards, wherein the first surface having the circular track is formed on the radially outwards facing second annular face, the first and second annular faces being parallel to one another.

6. A seal according to claim 5, wherein the second annular face presents a portion extending along a fraction of the shaft which is not surrounded by the stationary casing, the track provided with polarized marks being formed on said portion.

7. A device comprising a rotary shaft, a casing filled with liquid in which the rotary shaft penetrates, and a dynamic seal according to claim 1 having its sleeve constrained to rotate with the rotary shaft and having its sealing lip in sliding contact with the casing, thereby providing sealing between said shaft and said casing.

* * * * *